(12) United States Patent
Marpaung et al.

(10) Patent No.: US 10,084,542 B2
(45) Date of Patent: Sep. 25, 2018

(54) MICROWAVE PHOTONIC NOTCH FILTER

(71) Applicant: THE UNIVERSITY OF SYDNEY, Sydney, New South Wales (AU)

(72) Inventors: David Albert Immanuel Marpaung, Sydney (AU); Mattia Pagani, Sydney (AU); Shayan Shahnia, Sydney (AU)

(73) Assignee: THE UNIVERSITY OF SYDNEY, Sydney (AU)

( * ) Notice: Subject to any disclaimer, the term of this patent is extended or adjusted under 35 U.S.C. 154(b) by 0 days.

(21) Appl. No.: 15/736,446

(22) PCT Filed: Jun. 10, 2016

(86) PCT No.: PCT/AU2016/050481
§ 371 (c)(1),
(2) Date: Dec. 14, 2017

(87) PCT Pub. No.: WO2016/197207
PCT Pub. Date: Dec. 15, 2016

(65) Prior Publication Data
US 2018/0173022 A1   Jun. 21, 2018

(30) Foreign Application Priority Data

Jun. 12, 2015   (AU) ................................ 2015902229

(51) Int. Cl.
*H04B 10/2575*   (2013.01)
*H04B 10/516*   (2013.01)

(52) U.S. Cl.
CPC ..... *H04B 10/2575* (2013.01); *H04B 10/5165* (2013.01); *H04B 2210/006* (2013.01)

(58) Field of Classification Search
None
See application file for complete search history.

(56) References Cited

U.S. PATENT DOCUMENTS

| 2009/0214223 A1* | 8/2009 | Chen | ............... H04B 10/00 398/183 |
| 2009/0297155 A1* | 12/2009 | Weiner | ............... H04B 1/40 398/115 |

(Continued)

FOREIGN PATENT DOCUMENTS

WO   WO 2014/201519 A1   12/2014

OTHER PUBLICATIONS

PCT International Search Report and Written Opinion, PCT/AU2016/050481, dated Aug. 15, 2016, 10 Pages.

(Continued)

*Primary Examiner* — David Payne
*Assistant Examiner* — Casey Kretzer
(74) *Attorney, Agent, or Firm* — Fenwick & West LLP

(57) ABSTRACT

A microwave photonic notch filter comprising: a modulator to modulate an optical signal with an electrical signal to generate a first sideband and a second sideband; a configurable optical processor to generate a modified optical signal by adjusting the power of the sidebands to achieve a power difference between first sideband and second sideband and by producing an antiphase relationship between light within two sidebands corresponding to the selected frequency band; an optical resonance to adjust the power of the first sideband of the modified optical signal corresponding to the selected frequency band by a resonance power adjustment to generate a resonance output signal; an optical-to-electrical converter to generate a copy of the electrical signal with suppressed frequency components within the selected frequency band; and a control unit to re-configure the configurable optical processor to adjust the power difference between two sidebands towards the resonance power adjustment.

14 Claims, 9 Drawing Sheets

(56) References Cited

U.S. PATENT DOCUMENTS

2013/0028551 A1* 1/2013 DeSalvo ................ H03H 2/003
385/2
2018/0027314 A1* 1/2018 Fok ................... H04Q 11/0005

OTHER PUBLICATIONS

Marpaung, D., et al. "Harnessing Nonlinear Optics for Microwave Signal Processing," Apr. 12, 2015, Centre for Ultrahigh bandwidth Devices for Optical Systems (CUDOS), University of Sydney, Australia, 19 pages.

Minasian, R. A., et al., "Microwave Photonic Signal Processing," Optics Express, Sep. 23, 2013, vol. 21, No. 19, pp. 22918-22936.

Wang, X., et al., "All-Optical Continuously Tunable Flat-Passband Microwave Photonic Notch Filter," IEEE Photonics Journal, Feb. 2015, vol. 7, No. 1, 12 pages.

Wang, Y., et al., "Continuously Tunable Flat-Passband Microwave Photonic Notch Filter Based on Primary and Secondary Tap Distribution Impulse Response," IEEE Photonics Journal, Feb. 2015, vol. 7, No. 1, 12 pages.

Yao, J., "Microwave Photonics," Journal of Lightwave Technology, Feb. 1, 2009, vol. 27, No. 3, pp. 314-335.

Yi, X, et al., "Programmable Multiple True-Time-Delay Elements Based on a Fourier-Domain Optical Processor," Optics Letters, Feb. 15, 2012, vol. 37, No. 4, pp. 608-610.

* cited by examiner

MICROWAVE PHOTONIC NOTCH FILTER

TECHNICAL FIELD

This disclosure relates to filters for generating a copy of an electrical signal with suppressed frequency components within a selected frequency band.

BACKGROUND

A microwave notch filter is a key component in RF signal processing. This filter is used to remove unwanted signals from the RF spectrum, ideally without disturbing the desired signals. Key characteristics desired from such a filter are high resolution (narrow attenuation response), high extinction (high peak attenuation), and high bandwidth (large tunability of the notch frequency).

Existing filters suffer from severe drifts that prevent the creation of a stable high extinction filter. This poor long term stability in turn limits the applicability of the existing filters.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A filter for generating a copy of an electrical signal with suppressed frequency components within a selected frequency band comprises:
a modulator to generate a modulated optical signal that is modulated with the electrical signal and has a first sideband and a second sideband;
a configurable optical processor configured to modify the modulated optical signal to generate a modified optical signal by adjusting the power of the first sideband or the power of the second sideband or both to produce a difference between the power of the first sideband and the power of the second sideband and by producing an antiphase relationship between light within the first side band corresponding to the selected frequency band and light within the second side band corresponding to the selected frequency band;
an optical resonance to adjust the power of the first side band of the modified optical signal corresponding to the selected frequency band by a resonance power adjustment to generate a resonance output signal;
an optical-to-electrical converter to combine the resonance output signal with the second side band of the modulated signal to generate a copy of the electrical signal with suppressed frequency components within the selected frequency band; and
a control unit to re-configure the configurable optical processor to adjust the difference between the power of the first sideband and the power of the second sideband towards the resonance power adjustment.

As the control unit adjusts the power difference between the two sidebands towards the resonance power adjustment, the power within the selected frequency band of the two sidebands will be equal, which leads to complete cancellation and an extremely deep notch filter in the ideal case due to the antiphase relationship. In this process, the power difference is the only parameter that is adjusted, which is an advantage over other filters using Mach-Zehnder modulators as Mach-Zehnder modulators require multiple control signals, which complicates the optimisation search and leads to unstable solutions. As a result, the filter has a high stability.

The modulator may comprise a light source that is controlled by the electrical signal to generate the modulated optical signal.

Directly modulating the light source is often considered to be low-cost but insufficiently accurate. However, in combination with the optical processor the inaccuracies in the direct modulator can be compensated by the optical processor. The filter is simplified as no separate phase modulator is used, which has the advantage of lower cost and less complex set-up.

The light source may be a laser diode and may be current-controlled by the electrical signal.

The modulator may be configured to modulate an input optical wave with the electrical signal. The modulator may be a phase modulator.

The first side band of the modulated optical signal generated by the modulator may have equal power to the second side band of the modulated optical signal generated by the modulator.

As the optical processor adjusts the power of the sidebands appropriately a modulator can be used that generates equal sidebands. This is an advantage over other filters that require a modulator that generates unequal sidebands as modulators that generate unequal sidebands are more complex and less stable.

The configurable optical processor may comprise a waveshaper. The configurable optical processor comprises a Fourier domain optical processor.

The configurable optical processor may comprises:
a first optical path;
a second optical path;
a wavelength selective splitter to guide the first sideband onto the first optical path and the second sideband onto the second optical path;
a configurable power adjustor in one or both of the first optical path and the second optical path to adjust the power of one or both of the first optical path and the second optical path.

The power adjustor may comprise a configurable attenuator.

One or both of the first optical path and the second optical path may comprise a configurable phase shifter to produce the antiphase relationship between light within the first side band corresponding to the selected frequency band and light within the second side band corresponding to the selected frequency band.

The filter may be integrated into a photonic chip.

The optical resonance may comprise stimulated Brillouin scattering. The optical resonance may comprise a resonance ring. The optical resonance may comprise stimulated Brillouin scattering and a resonance ring.

A method for generating a copy of an electrical signal with suppressed frequency components within a selected frequency band comprises:
generating a modulated optical signal that is modulated with the electrical signal and has a first sideband and a second sideband;
using a configurable optical processor to modify the modulated optical signal to generate a modified optical signal by adjusting the power of the first sideband or the power of the second sideband or both to produce a difference between the power of the first sideband and the power of the second sideband and by producing an antiphase relationship between light within the first side band corresponding to the selected frequency band and light within the second side band corresponding to the selected frequency band;

coupling the modified optical signal into an optical resonance to adjust the power of the first side band of the modulated optical signal corresponding to the selected frequency band by a resonance power adjustment to generate a resonance output signal;

combining the resonance output signal with the second side band of the modulated signal to generate a copy of the electrical signal with suppressed frequency components within the selected frequency band; and re-configuring the configurable optical processor to adjust the difference between the power of the first sideband and the power of the second sideband towards the resonance power adjustment.

Optional features described of any aspect of method, computer readable medium or computer system, where appropriate, similarly apply to the other aspects also described here.

BRIEF DESCRIPTION OF DRAWINGS

An example will be described with reference to

FIG. 6a illustrates a filter circuit while

FIG. 10 illustrates measurements of the notch filter response after 12 hour intervals of continuous operation in an experimental setup.

DESCRIPTION OF EMBODIMENTS

This disclosure relates to precise spectral shaping necessary to achieve improved long term stability of the filter operation. One aspects of this disclosure is sideband spectral shaping, where instead of using a dual-parallel Mach-Zehnder (electro-optic) modulator (DPMZM) a combination of phase modulator and a configurable optical signal processor is used.

The use of bias-free phase modulator leads to stable operation. The use of a configurable optical signal processor allows separate phase and amplitude reconfiguration of optical sidebands, leading to ease of control of the filter.

The configurable processor can be implemented as a Fourier domain processor in liquid crystal on silicon (LCoS) such as the waveshaper, or as a photonic integrated circuit.

The photonic integrated circuit can be implemented as cascade of a sideband demultiplexer, optical phase shifter, and an optical attenuator. This implementation leads to a stable filter operation over 24 hours.

The optical resonance can be achieved using nonlinear optical process such as stimulated Brillouin scattering (SBS). Alternatively, or in conjunction, the optical resonance can be achieved using a structural resonance such as an optical ring resonator (ORR).

Figure 1:
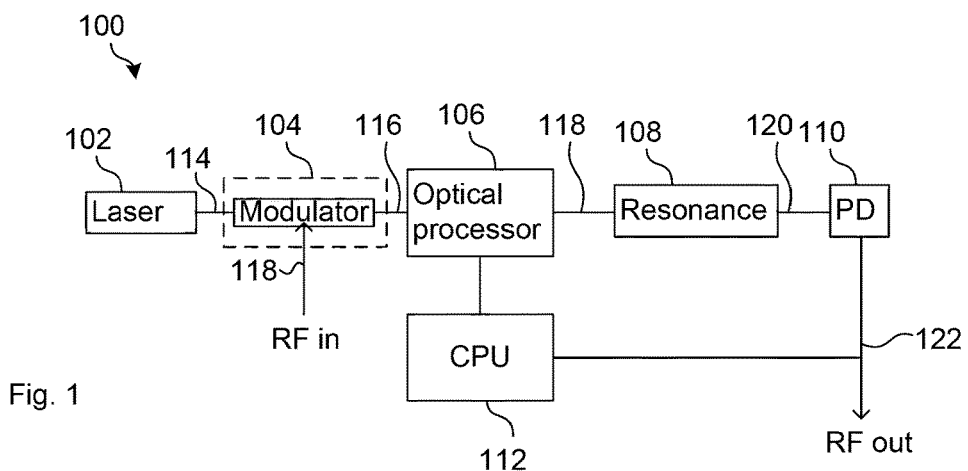
FIG. 1 illustrates a schematic of a microwave photonic notch filter.

FIG. 1 illustrates a schematic of a filter 100 for generating a copy of an electrical signal with suppressed frequency components within a selected frequency band. Filter 100 comprises a laser 102 coupled to a phase modulator 104 that is, in turn, coupled to a configurable optical processor 106. Throughout this disclosure, programmable optical processor 106 is also referred to as configurable optical processor 106. The optical processor 106 is coupled to an optical resonance 108 which is coupled to an optical-to-electrical converter 110, such as a photodiode. A control unit 112 is connected to converter 110 and to optical processor 106. When in use, laser 102 generates an input optical wave 114 for modulator 104.

For a small signal, the phase modulator 104 generates a modulated optical signal 116 that is modulated with an electrical RF signal 118 and has a first sideband and a second sideband. That is, modulated optical signal 116 is a dual sideband signal where one sideband is in phase with the optical carrier, while the other sideband is completely out of phase.

$$E \propto \underbrace{J_0(m_{RF})}_{E_c} + \underbrace{J_1(m_{RF})e^{j\omega_{RF}t}}_{E_U} - \underbrace{J_1(m_{RF})e^{-j\omega_{RF}t}}_{E_L}$$

One advantage with this modulator 104 is its bias-free operation, hence removing the main source of instabilities.

The reconfigurable optical processor 106 ideally provides the following transfer function:

$$H_{shaper}(\omega) = \begin{cases} 1 & \text{for } E_c \text{ and } E_{L/U} \\ A_{U/L}\exp(j\phi_{U/L}) & \text{for } E_{U/L} \end{cases}$$

Where $0 < A_{U/L} < 1$ and $0 < \phi_{U/L} < 2\pi$.

This means that the processor 106 synthesizes a tunable amplitude and phase over the entire frequency range of one of the sidebands, and passes the other parts of the spectrum without attenuation or phase shift. Note that the phase shift imparted on one of the processed sidebands is constant over the entire frequency content of this sideband.

Hence the optical field at the output of the processor is $$E \propto J_0(m_{RF}) + A_U J_1(m_{RF})e^{j\omega_{RF}t}e^{j\phi_U} - J_1(m_{RF})e^{-j\omega_{RF}t}$$

In other words, the optical processor 106 is configured to modify the modulated optical signal 116 to generate a modified optical signal 118 by adjusting the power of the first sideband or the power of the second sideband or both to produce a difference between the power of the first sideband and the power of the second sideband and by producing an antiphase relationship between light within the first side band corresponding to the selected frequency band and light within the second side band corresponding to the selected frequency band.

Figure 2:
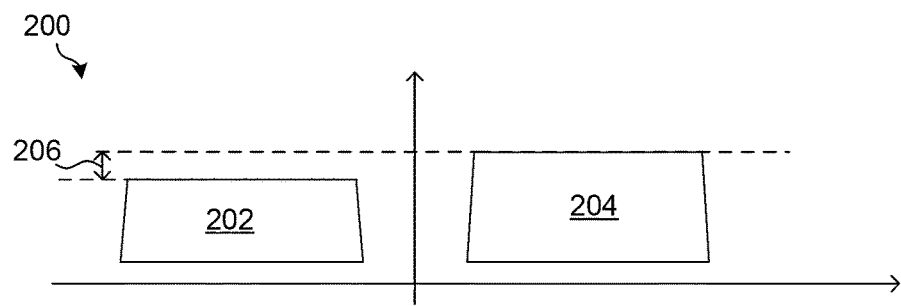
FIG. 2 illustrates a spectrum comprising a first sideband and a second sideband.

FIG. 2 illustrates a spectrum 200 comprising a first sideband 202 and a second sideband 204. Between the power of the first spectrum 202 and the power of the second spectrum there is a difference 206.

This spectrum 200 becomes the input 118 to the optical resonant filter 108. If the resonant filter 108 exhibits gain, i.e. $|G(\omega)|>1$ then the optical filter acts on the processed sideband and the output spectrum of the modified optical signal 120 from the filter becomes $$E \propto J_0(m_{RF}) + G(\omega) A_U J_1(m_{RF}) e^{j\omega RFt} e^{j\phi U} e^{j\phi(\omega)} - J_1(m_{RF}) e^{-j\omega RFt}$$

Figure 3:
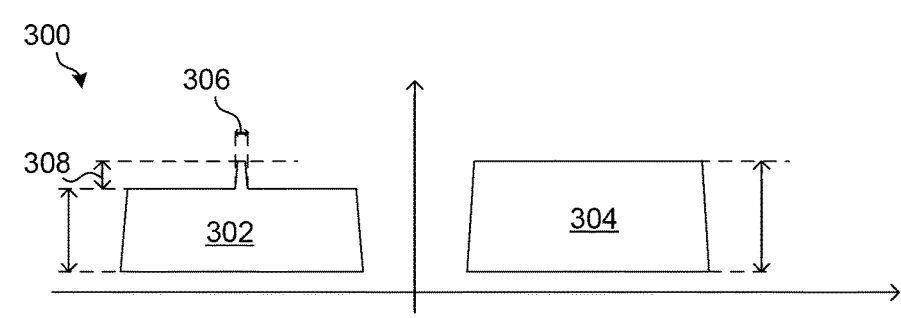
FIG. 3 illustrates a spectrum of a modified optical signal.

FIG. 3 illustrates a spectrum 300 of the modified optical signal 120. Spectrum 300 again comprises a first sideband 302 and a second sideband 304. The optical resonance 108 adjusts the power of the first sideband 302 of the modified optical signal 118 corresponding to a selected frequency band 306 of the first sideband 302 by a resonance power adjustment 308. In the case of gain, the power within the selected frequency band 306 is now greater than the power of the remaining first sideband 302.

Whereas in the case of an attenuating optical filter, $|G(\omega)|<1$, the filter acts on the unprocessed sideband:

$$E \propto J_0(m_{RF}) + A_U J_1(m_{RF}) e^{j\omega RFt} e^{j\phi U} - G(\omega) J_1(m_{RF}) e^{-j\omega RFt} e^{j\phi(\omega)}$$

The optical-to-electrical converter 110 combines the resonance output signal 120 corresponding to first sideband 302 with the second side band 304 of the modulated signal 118 to generate a copy of the electrical signal with suppressed frequency components within the selected frequency band.

Control unit 112 re-configures the configurable optical processor 106 to adjust the difference 206 between the power of the first sideband and the power of the second sideband towards the resonance power adjustment 306 to aim for perfect cancellation.

In this case the condition to create a cancellation notch is simplified to:

Amplitude condition: $A_U = |G(\omega_{Notch})|$

Phase condition: $\phi_U = \phi(\omega_{Notch})$

This means that the optical processor 106 synthesizes independent phase and amplitude to match those of the optical resonant filter. This simplifies remarkably the process to satisfy the condition to create the cancellation bandstop filter, and the process to maintain its depth to a maximum.

Figure 4:
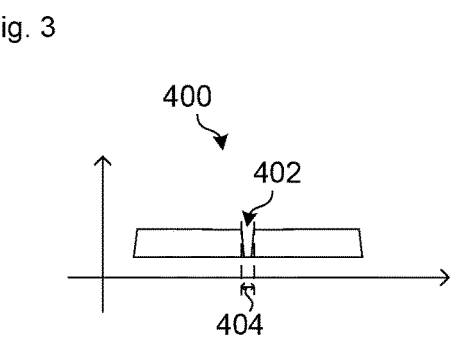
FIG. 4 illustrates a spectrum of the output RF signal comprising a notch at the selected frequency band.

FIG. 4 illustrates a spectrum 400 of the output RF signal comprising a notch 402 at the selected frequency band 404. In one example, control unit 112 measures the signal power within the selected frequency band 404 and reconfigures optical processor 106 to increase difference 206 between first sideband 202 and second sideband 204. Control unit 112 then measures the signal power again to determine the next adjustment of the difference 206. For example, control unit 112 performs a gradient descent or Newton's method to arrive at a minimum signal power in the selected frequency band 404.

In other example, control unit 112 performs a PID control with the signal power in the selected frequency band 404 being the error value and the difference 206 being the control value. The control parameters may be tuned using the Ziegler-Nichols method.

The optical signal processor 106 may be a Fourier domain signal processor based on liquid crystal on silicon (LCoS). This device is also known as the waveshaper. The device is capable of creating a frequency band where attenuation and constant phase shift can be applied independently in a continuously tunable manner, thereby approximating the ideal transfer function of the reconfigurable optical processor.

The resonant optical filter 108 may be stimulated Brillouin scattering (SBS) gain in a spool of single mode optical fiber, hence $|G(\omega)|>1$.

Figure 5:
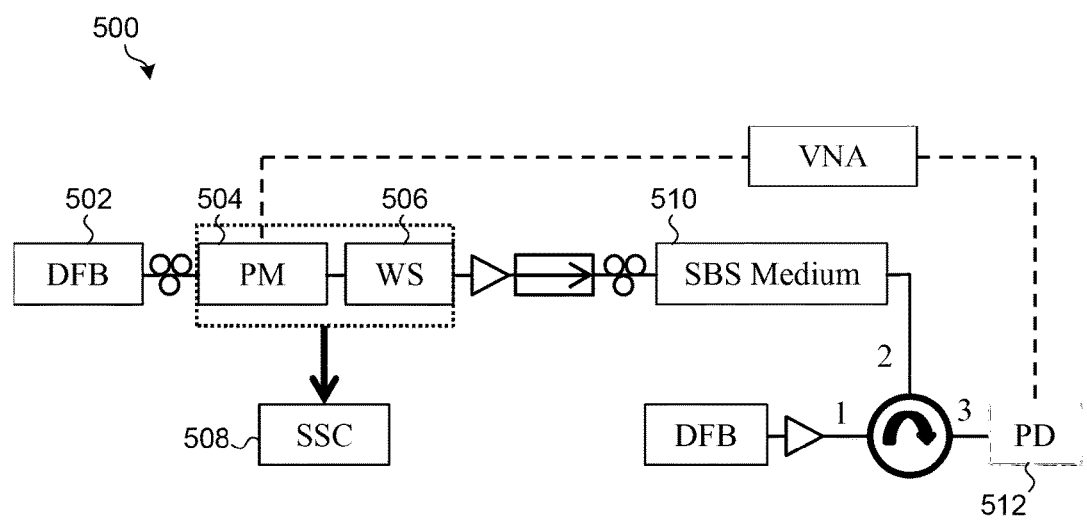
FIG. 5 illustrates a schematic of an example implementation.

FIG. 5 illustrates a schematic 500 of an example implementation comprising a distributed feedback laser 502, a phase modulator 504, waveshaper 506, sideband spectral controller 508, stimulated Billouin scattering medium 510 and photodetector 512.

The waveshaper 506 may be configured to match the phase and amplitude given by the SBS gain 510 as explained above with reference to FIGS. 2 and 3. The waveshaper attenuation may be actively controlled using a computer 112 to maintain highest rejection of the filter.

One advantage of the disclosed technique is the simple and tractable notch conditions, allowing active stabilization of the filter by simple adjustments o the waveshaper attenuation.

Other Implementation of the Sideband Spectral Shaper

Figure 6A:
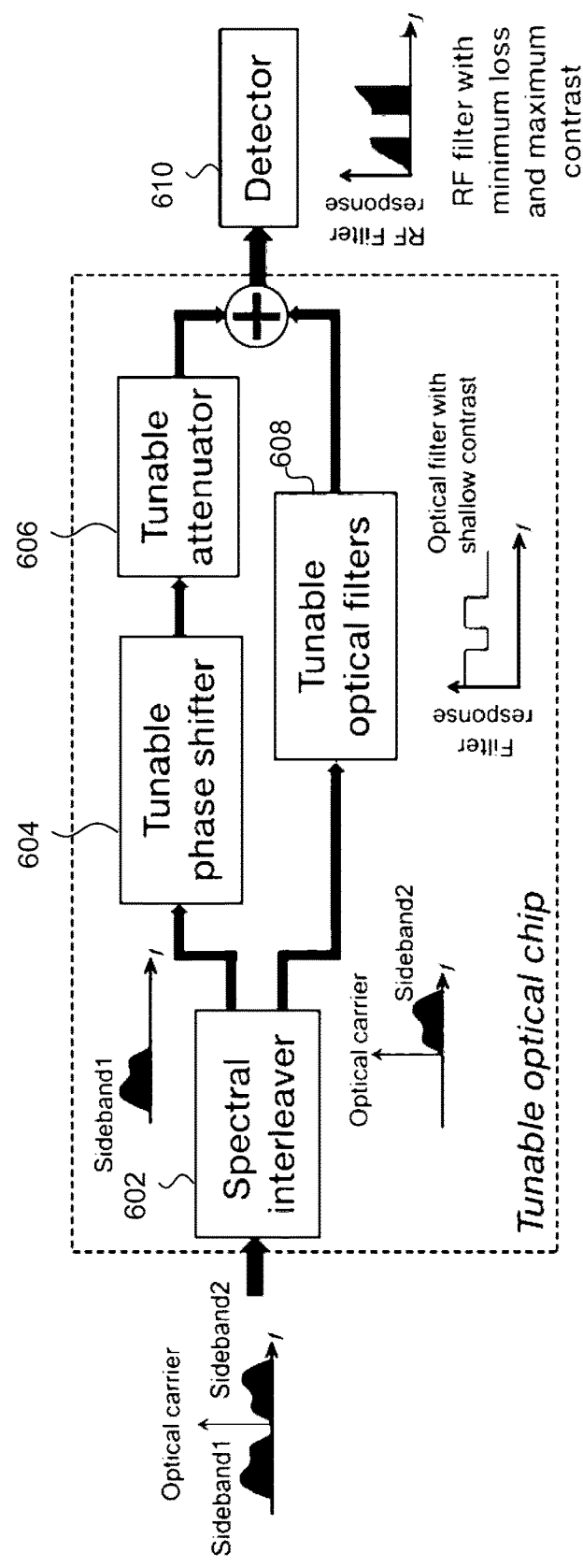

The waveshaper is only one implementation of the optical processor 106. Another route to this is to combine sideband demultiplexing, optical phase shifting, and optical attenuation. Spectral control with order-of-magnitude improved stability that is free from detrimental trade-offs can be achieved in a stable, dedicated optical circuit. Operation of such circuit is illustrated in FIG. 6a. The optical sidebands are first separated in two optical paths using an optical interleaver, also referred to as a wavelength selective splitter. The sideband in one output of the interleaver is then passed through a broadband tunable phase shifter and an optical attenuator. In this way, the ratio of sidebands amplitude and phase can be tuned independently, without affecting the optical carrier. The other output of the interleaver is passed through a reconfigurable optical filter which can be integrated in the same circuit. After photodetection process, the resulting RF filter response has the same shape and resolution as that of the optical filter, but with maximum suppression at the stop-bands and minimum loss at the pass-bands.

Figure 6B:
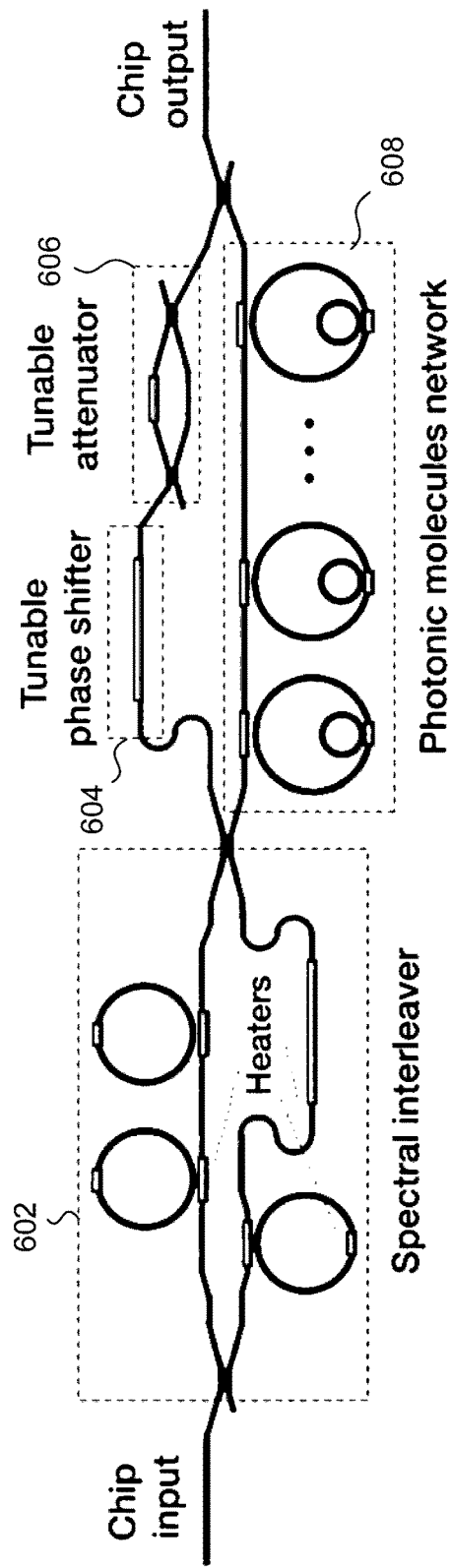
FIG. 6b illustrates the components in more detail.

FIG. 6a illustrates a filter circuit 600 while FIG. 6b illustrates the components of filter 600 in more detail. Filter 600 integrates a sideband spectral shaper and comprises a spectral interleaver 602, tunable phase shifter 604, tunable attenuator 606, tunable optical filters 608 and photo detector 610. The spectral interleaver 602 can be implemented as a 3 ring-assisted Mach-Zehnder interferometer (RAMZI) structure with a square response, high suppression (~40 dB), and bandwidth in the order of 100 GHz. The tunable phase shifter 604 and attenuator 606 can be implemented as a simple thermal-tuned waveguide and a tunable MZI coupler, respectively. A network of photonic molecules can be used as optical resonant filter 608 with MHz resolution. These are coupled-resonator structures, in which the interactions of individual resonator modes give rise to new resonances with much higher quality factors.

The demultiplexing, phase shifting and attenuating technique may be implemented using fiber optic devices. Commercial arrayed waveguide grating mux/demux may be used as the spectral interleaver, a tunable optimal delay line as the phase shifter, and a variable optical attenuator to control the sideband amplitudes. Using this setup may achieve control of modulation format from pure intensity modulation to pure phase modulation. By adjusting the phase and amplitude of the sideband the modulation formats may be transformed from pure intensity modulation (highest RF power) to pure phase modulation (lowest RF power).

The directly modulated laser can be of several kinds. One example includes a distributed feedback (DFB) laser, example products are: DFB-10G-DM-1550 by Optilab, LLC. or DM200-01-3/4 by Finisar Corporation. Another example includes a vertical cavity surface emitting laser (VCSEL), such as VCSEL-1550-SM by Optilab, LLC. Yet another example includes an integrated laser and electro-absorption modulator (EML), such as OL5157M by Oki Electric Industry Co., Ltd The photodetector may be XPDV21x0(RA) by Finisar Corporation The resonator may an integrated optical ring resonator. The resonator may be a microdisk resonator. The resonator may be a whispering gallery mode resonator. The resonator may be a-Bragg-gratings. The resonator may be a stimulated brillouin scattering.

Figure 7:
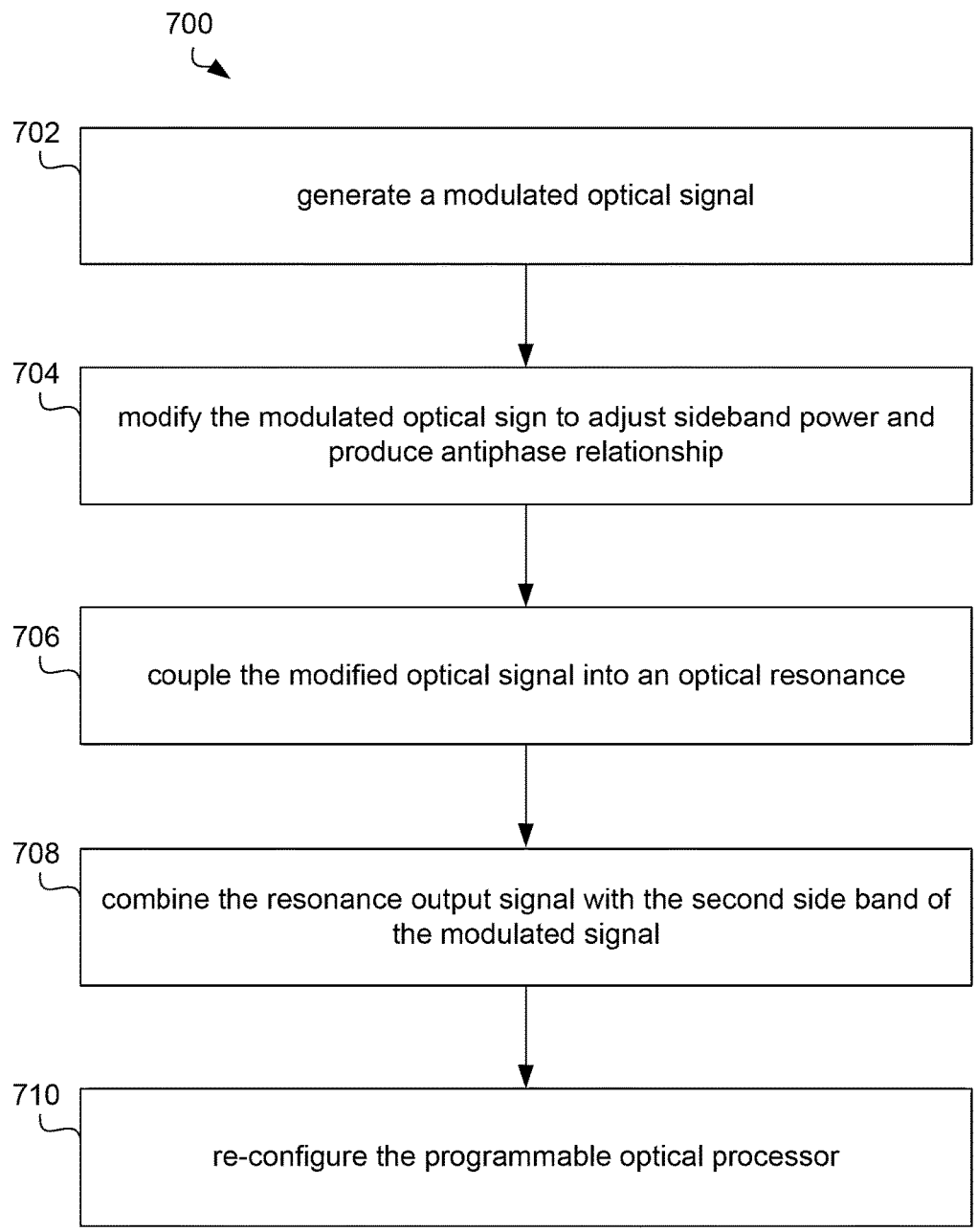
FIG. 7 illustrates a method performed by a microwave photonic notch filter.

FIG. 7 illustrates a method 700 performed by a filter for generating a copy of an electrical signal with suppressed frequency components within a selected frequency band based on the description above. The method commences by generating 702 a modulated optical signal that is modulated with the electrical signal and has a first sideband and a second sideband.

The next step is to use 704 configurable optical processor 106 in FIG. 1 to modify the modulated optical signal to generate a modified optical signal. The processor 106 adjusts the power of the first sideband or the power of the second sideband or both to produce a difference between the power of the first sideband and the power of the second sideband. Processor 106 further produces an antiphase relationship between light within the first side band corresponding to the selected frequency band and light within the second side band corresponding to the selected frequency band.

The modified optical signal is then coupled 706 into an optical resonance to adjust the power of the first side band of the modulated optical signal corresponding to the selected frequency band by a resonance power adjustment to generate a resonance output signal.

The filter then combines 708 the resonance output signal with the second side band of the modulated signal to generate a copy of the electrical signal with suppressed frequency components within the selected frequency band.

A control unit then re-configures 710 the configurable optical processor to adjust the difference between the power of the first sideband and the power of the second sideband towards the resonance power adjustment.

Figure 8:
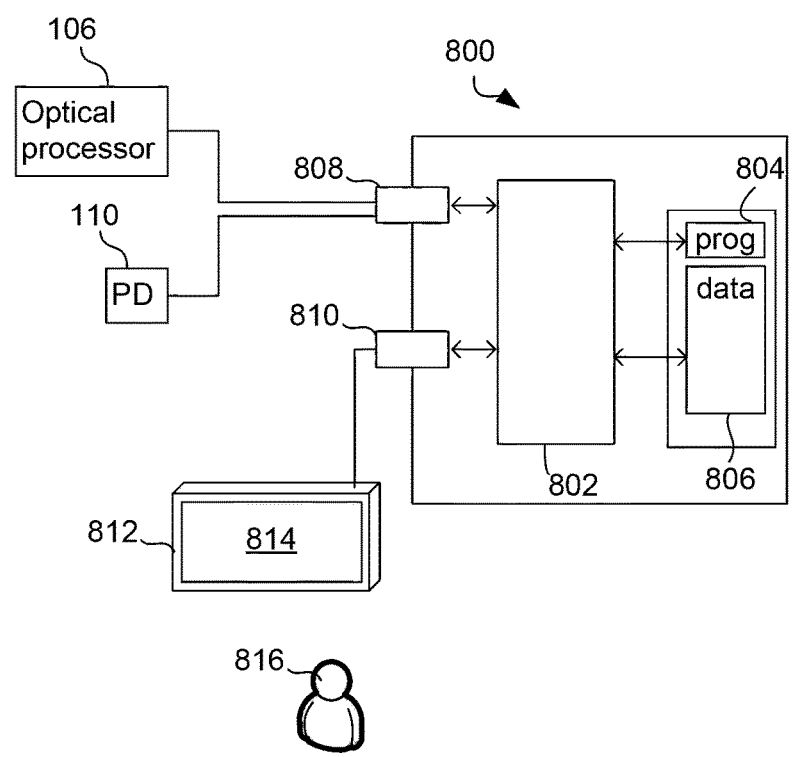
FIG. 8 illustrates a computer system to re-configure a configurable optical processor.

FIG. 8 illustrates a computer system 800 to re-configure the configurable optical processor 106. The computer system 800 comprises a processor 802 connected to a program memory 804, a data memory 806, a communication port 808 and a user port 810. The program memory 804 is a non-transitory computer readable medium, such as a hard drive, a solid state disk or CD-ROM. Software, that is, an executable program stored on program memory 804 causes the processor 802 to determine updated parameters, such as parameters that adjust the difference between the power of the first sideband and the power of the second sideband towards the resonance power adjustment, for optical processor 106 and configures optical processor 106 with the updated parameters. The determination of the updated parameters is based on signal measurements received from photo detector 110.

The processor 802 may then store the updated parameters on data store 806, such as on RAM or a processor register. Processor 802 may also send the determined parameters via communication port 808 to optical processor 106.

The processor 802 may receive data, such as signal measurements, from data memory 806 as well as from the communications port 808 and the user port 810, which is connected to a display 812 that shows a visual representation 814 of the filter characteristics to a user 816.

In one example, the processor 802 receives and processes the signal data in real time. This means that the processor 802 determines the updated parameters every time signal data is received from photo detector 110 and completes this calculation before the photo detector 110 send the next signal data update.

Although communications port 808 and user port 810 are shown as distinct entities, it is to be understood that any kind of data port may be used to receive data, such as a network connection, a memory interface, a pin of the chip package of processor 802, or logical ports, such as IP sockets or parameters of functions stored on program memory 804 and executed by processor 802. These parameters may be stored on data memory 806 and may be handled by-value or by-reference, that is, as a pointer, in the source code.

The processor 802 may receive data through all these interfaces, which includes memory access of volatile memory, such as cache or RAM, or non-volatile memory, such as an optical disk drive, hard disk drive, storage server or cloud storage. The computer system 800 may further be implemented within a cloud computing environment, such as a managed group of interconnected servers hosting a dynamic number of virtual machines.

It is to be understood that any receiving step may be preceded by the processor 802 determining or computing the data that is later received. For example, the processor 802 determines a signal data and stores the signal data in data memory 806, such as RAM or a processor register. The processor 802 then requests the signal data from the data memory 806, such as by providing a read signal together with a memory address. The data memory 806 provides the data as a voltage signal on a physical bit line and the processor 802 receives the signal data via a memory interface.

Experiments

Experiments will now be described with reference to FIGS. 9 to 11. It is to be appreciated that the following disclosure are examples only and should be considered illustrative and not restrictive of the broad general scope of the present disclosure.

An experiment was carried out to test the performance of the new filter configuration, and measure its stability. The optical resonance in this case was provided through SBS in optical fiber. In the setup 900, shown in FIG. 9, two DFB lasers 901, 902 in CW mode with 20 dBm output power, were used to generate the SBS pump and Stokes waves. The first laser wavelength was set to 1550 nm, and was sent through a phase modulator (PM) 903, where it was modulated by an input RF signal supplied by a vector network analyzer (VNA) 905. The phase-modulated signal then passed through the FD-OP (Finisar Waveshaper 4000s, denoted as WS 907 in FIG. 9). The Waveshaper 907 was used to attenuate one of the sidebands, without affecting the carrier, or the other sideband. Due to imperfections in the phase modulator 903, and to account for fiber dispersion, the Waveshaper response was also used to provide a small, yet nonzero, phase contribution (so that $(\theta_C-\theta_L)-(\theta_U-\theta_C)=+/-\pi$ is satisfied). Finally, the signal was launched in a 1.6 km length of single mode fiber (SMF) 909 where the SBS interaction occurred, before being detected at the photodetector. The frequency of the laser used for generating the SBS pump wave was set such that the SBS gain resonance occurred on the attenuated sideband. In this way, the amplitudes of the sidebands were equalized only over a frequency range approximately equal to the SBS linewidth (~35 MHz), resulting in a narrowband notch response in the electrical domain. The operational bandwidth of the filter was from 0 to 30 GHz, limited by the bandwidth of the modulator. While the signal had to travel through more than 1 km of fiber, we note that fiber dispersion did not have a significant effect on the filter passband due to the modulation format used for the cancellation filter, where one of the sidebands is considerably stronger than the other. Effectively, the signal spectrum resembled that of a single sideband modulated signal, which is immune to fiber dispersion.

Initially, the system 900 was optimized to achieve maximum notch suppression. This involved setting the WS attenuation to match the magnitude of the SBS resonance (5 dB). The system was then left running freely for a 24 hour period in an uncontrolled environment, subject to temperature and pressure fluctuations, and the filter response continually monitored. The 24-hour measurement was repeated with a computer program monitoring the notch filter response over time, and actively adjusting the WS attenuation to maintain maximum notch suppression. This active control loop involved using the VNA to continuously measure the magnitude response of the filter. The VNA trace was then input to a computer program which measured the filter suppression (defined as the ratio of maximum to minimum transmission). If the measured value was found to be below a predetermined minimum suppression level, the program sent a control signal to the Waveshaper which adjusted its attenuation, and the corresponding ratio between the modulation sidebands. A hill climbing algorithm was used to determine whether the Waveshaper suppression had to be increased or decreased. The speed of the control process was mainly limited by the response time of the Waveshaper, in the order of 3 seconds.

Figure 9:
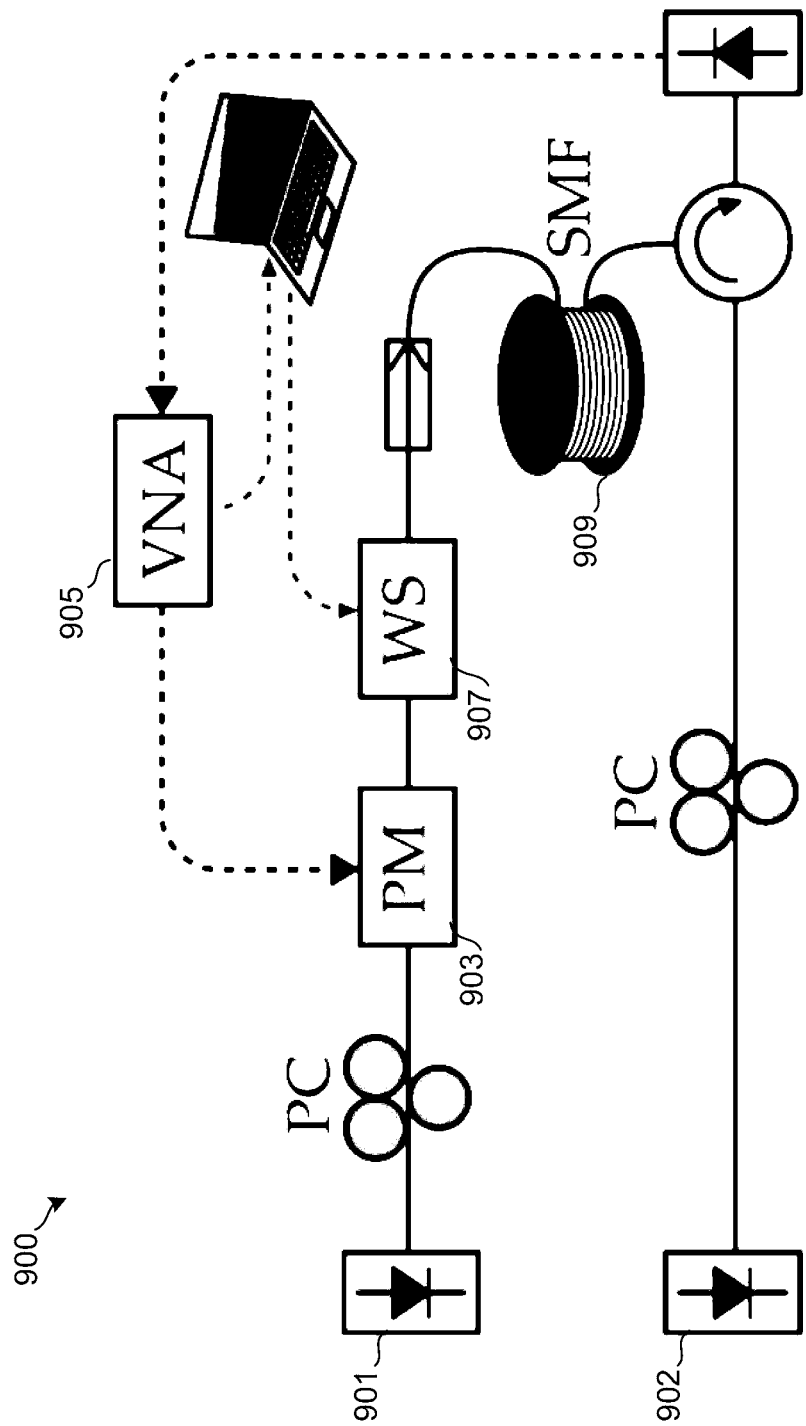
FIG. 9 illustrates an experimental setup for a notch filter, with a phase modulator (PM) and a waveshaper (WS) used for tailoring the sidebands' spectra. The filter response was measured with a vector network analyzer (VNA). The stimulated Brillouin scattering (SBS) interaction occurred in a 1.6 km spook of single-mode fiber (SMF). Polarization controllers (PC) were used to minimize losses and to maximize the strength of the SBS interactions.
Figures 10A, 10B, 10C:
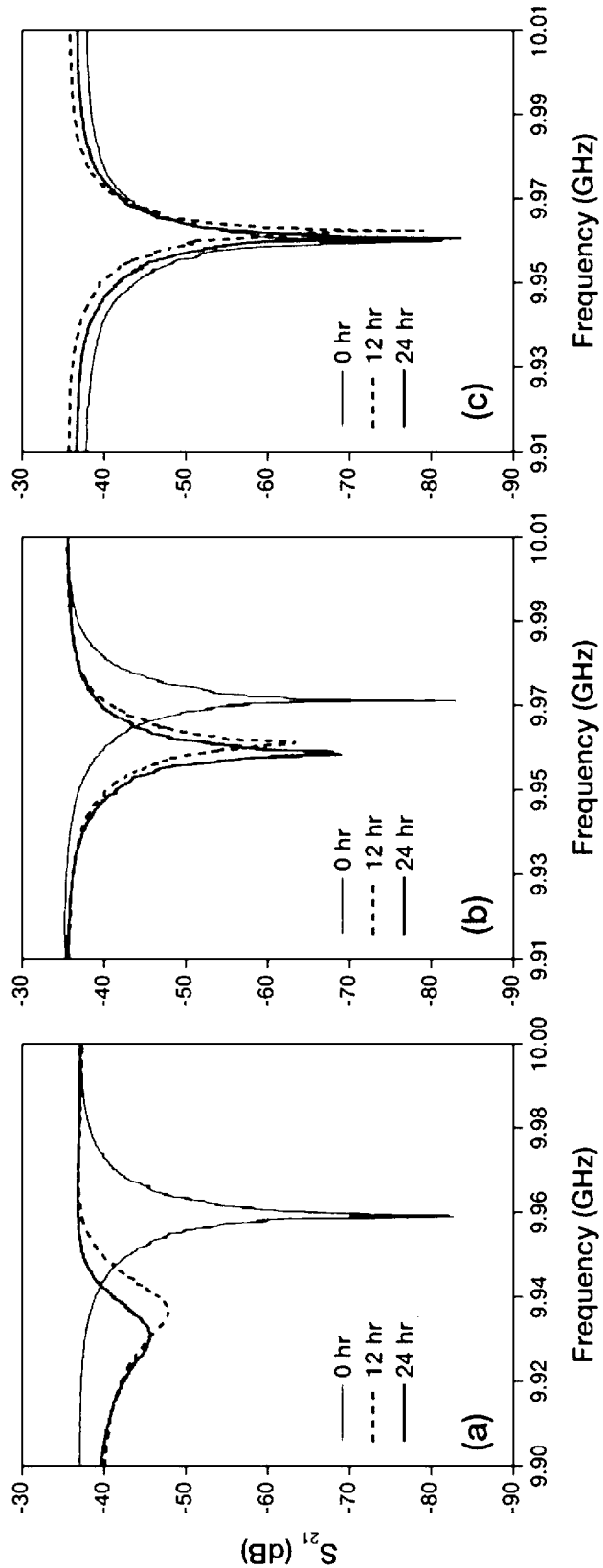
FIG. 10(a) shows sideband tailoring performed using a DPMZM.
FIG. 10(b) shows sideband tailoring performed using a PM in combination with waveshaper.
FIG. 10(c) shows sideband tailoring performed using PM in combination with waveshaper, driven by software to actively control the waveshaper attenuation.

The long-term measurements were repeated also using the conventional filter topology (this is similar to FIG. 9, but with the PM and Waveshaper replaced by the DPMZM). This allowed us to obtain a direct comparison between the stability of these two filter topologies. FIGS. 10(a) to 10(c) shows the measured filter responses at the start of the measurement (i.e. with optimized notch filter suppression), and after 12 and 24 hours of continuous operation, for all three sideband tailoring methods. The drift in the center frequency of the notch was due to free running arrangement of the lasers. Over the 24 hour measurement period, the maximum laser frequency drift was measured as 15 MHz. In the DPMZM measurements, shown in FIG. 10(a), the notch frequency drift is larger than this value due to the inherent instability of the DPMZM output. This instability causes the phase relations between the sidebands to deviate from the ideal antiphase state, such that the destructive interference of the RF mixing products occurs at a frequency offset from the SBS line center, where its phase contribution is nonzero.

While the filter can be considered active due to the use of SBS (a gain mechanism) for obtaining the notch response, it is important to note that SBS has an effect solely in the filter stopband, and not in the passband. In the passband, no gain mechanism was utilized, and therefore the noise figure of the filter is similar to that of a standard microwave photonic link. In our experiments we measured a link gain level of −35 dB (as shown in FIG. 10), and the noise figure can be roughly estimate as the inverse of the link gain (~35 dB).

Figure 11:
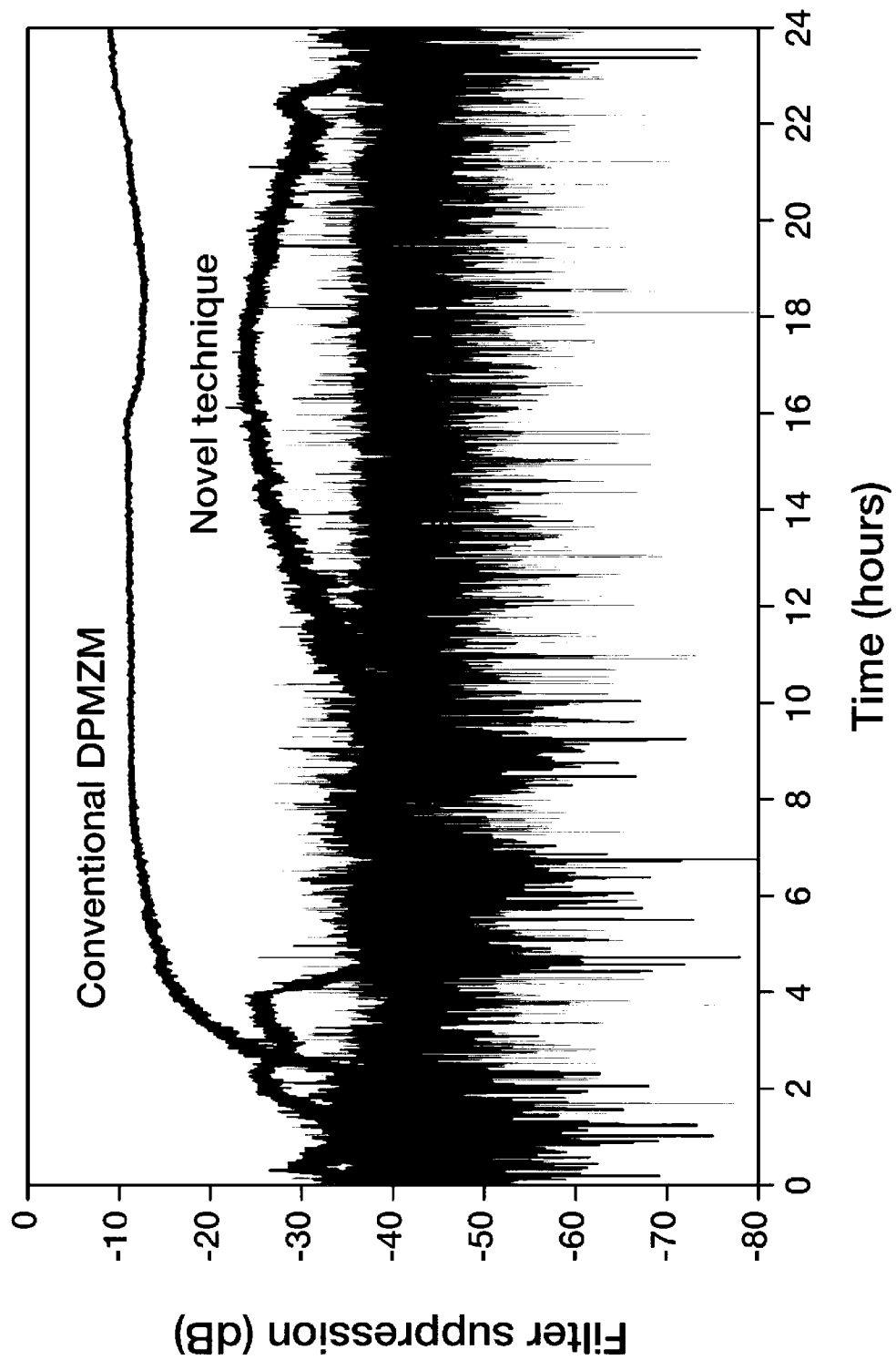
FIG. 11 illustrates measurements of the notch filter suppression over a 24 hour period of continuous operation in an experimental setup. The three plots denote different methods for tailoring the sideband's spectra.

FIG. 11 shows the measurement of the notch filter suppression across the whole 24-hour period. The main source of instability during each 24-hour period was a drift in the SBS pump power and polarization. This caused fluctuations in the SBS resonance amplitude, which in turn causes $E_L=GE_U$ (where $E_L$, $E_U$ are the amplitudes of the lower and upper frequency bands while G denotes the peak magnitude response of the optical resonance) to no longer hold true. From the measurements however it is clear that the DPMZM implementation had an additional source of instability (due to bias drifts) which caused the filter response to deteriorate more rapidly. The inherently unstable nature of the DPMZM, combined with the high complexity of its response, presented a major obstacle to realizing software control for filter stabilization. On the contrary, the simplicity of the PM and WS implementation enabled the realization of active software control, which greatly stabilized the filter response. While, on average, the filter suppression obtained with the active control method (in this experiment) achieved higher suppression than the other two methods, it is clear that its value also experienced more fluctuations. It is important to note that any suppression beyond 50 dB was subject to the noise floor of the system, and therefore varied randomly. The fluctuations that occurred for suppression values lower than 40 dB however were due to the active control algorithm, which on average required multiple iteration steps to correct the Waveshaper attenuation to maximize the filter's suppression. The correction algorithm itself was relatively simple, and designed only as a proof of concept.

The approach of independent tailoring of phase and amplitude of optical carrier and modulation sidebands may define the new waves of MWP processing, not only for filtering, but also for other signal processing such as phase shifting and link gain optimization. Approaches to integrate this tailoring functionality in a photonic chip may gain significant attention to redefine the field of linear and nonlinear integrated microwave photonics.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A filter for generating a copy of an electrical signal with suppressed frequency components within a selected frequency band, the filter comprising:
 a modulator to generate a modulated optical signal that is modulated with the electrical signal and has a first sideband and a second sideband;
 a configurable optical processor configured to modify the modulated optical signal to generate a modified optical signal by adjusting the power of the first sideband or the power of the second sideband or both to produce a difference between the power of the first sideband and the power of the second sideband and by producing an antiphase relationship between light within the first side band corresponding to the selected frequency band and light within the second side band corresponding to the selected frequency band;

an optical resonant filter to adjust the power of the first side band of the modified optical signal corresponding to the selected frequency band by a resonance power adjustment to generate a resonance output signal;

an optical-to-electrical converter to combine the resonance output signal with the second side band of the modulated signal to generate a copy of the electrical signal with suppressed frequency components within the selected frequency band; and a control unit to re-configure the configurable optical processor to adjust the difference between the power of the first sideband and the power of the second sideband towards the resonance power adjustment.

2. The filter of claim 1, wherein the modulator comprises a light source that is controlled by the electrical signal to generate the modulated optical signal.

3. The filter of claim 1, wherein the modulator is configured to modulate an input optical wave with the electrical signal.

4. The filter of claim 3, wherein the modulator is a phase modulator.

5. The filter of claim 1, wherein the first side band of the modulated optical signal generated by the modulator has equal power to the second side band of the modulated optical signal generated by the modulator.

6. The filter of claim 1, wherein the configurable optical processor comprises a waveshaper.

7. The filter of claim 1, wherein the configurable optical processor comprises a Fourier domain optical processor.

8. The filter of claim 1, wherein the optical processor comprises:
- a first optical path;
- a second optical path;
- a wavelength selective splitter to guide the first sideband onto the first optical path and the second sideband onto the second optical path;
- a configurable power adjustor in one or both of the first optical path and the second optical path to adjust the power of one or both of the first optical path and the second optical path.

9. The filter of claim 8, wherein the power adjustor comprises a configurable attenuator.

10. The filter of claim 8, wherein one or both of the first optical path and the second optical path comprise a configurable phase shifter to produce the antiphase relationship between light within the first side band corresponding to the selected frequency band and light within the second side band corresponding to the selected frequency band.

11. The filter of claim 1, wherein the filter is integrated into a photonic chip.

12. The filter claim 1, wherein the optical resonant filter comprises stimulated Brillouin scattering.

13. The filter of claim 1, wherein the optical resonant filter comprises a resonance ring.

14. A method for generating a copy of an electrical signal with suppressed frequency components within a selected frequency band, the method comprising:

generating a modulated optical signal that is modulated with the electrical signal and has a first sideband and a second sideband;

using a configurable optical processor to modify the modulated optical signal to generate a modified optical signal by adjusting the power of the first sideband or the power of the second sideband or both to produce a difference between the power of the first sideband and the power of the second sideband and by producing an antiphase relationship between light within the first side band corresponding to the selected frequency band and light within the second side band corresponding to the selected frequency band;

coupling the modified optical signal into an optical resonant filter to adjust the power of the first side band of the modulated optical signal corresponding to the selected frequency band by a resonance power adjustment to generate a resonance output signal;

combining the resonance output signal with the second side band of the modulated signal to generate a copy of the electrical signal with suppressed frequency components within the selected frequency band; and re-configuring the configurable optical processor to adjust the difference between the power of the first sideband and the power of the second sideband towards the resonance power adjustment.

* * * * *